United States Patent

Patnode

[11] 3,954,296
[45] May 4, 1976

[54] COMBINED AUXILIARY CAB AND TONNEAU COVER FOR TRUCK

[76] Inventor: Le Roy K. Patnode, 115 G. Harvey West St., Santa Cruz, Calif. 95060

[22] Filed: May 8, 1974

[21] Appl. No.: 468,210

[52] U.S. Cl. .............................. 296/10; 296/99 A; 296/137 B
[51] Int. Cl.² .......................................... B60P 3/42
[58] Field of Search ................. 296/99, 100, 137 B, 296/10, 23 MC, 24 R; 49/477

[56] References Cited
UNITED STATES PATENTS

| | | | |
|---|---|---|---|
| 3,169,792 | 2/1965 | Solano Viquez | 296/99 |
| 3,303,615 | 2/1967 | O'Neal | 296/23 MC |
| 3,419,304 | 12/1968 | Sangimino | 296/99 |
| 3,485,522 | 12/1969 | Reinarts | 296/24 R |
| 3,489,456 | 1/1970 | Klanke | 296/100 |
| 3,508,786 | 4/1970 | Colville | 296/99 |

FOREIGN PATENTS OR APPLICATIONS

| | | | |
|---|---|---|---|
| 525,324 | 5/1955 | Italy | 49/477 |

Primary Examiner—Robert J. Spar
Assistant Examiner—Donald W. Underwood
Attorney, Agent, or Firm—Robert G. Slick

[57] ABSTRACT

A combined auxiliary cab and tonneau cover is provided for a pickup truck. The auxiliary unit is easy to attach and detach from a vehicle and provides positive locking of the truck bed. The space enclosed by the auxiliary cab can be used as a children's seat or as cargo space.

6 Claims, 7 Drawing Figures

COMBINED AUXILIARY CAB AND TONNEAU COVER FOR TRUCK

SUMMARY OF THE INVENTION

The present invention relates to an auxiliary cab and tonneau unit which is adapted for installation on a pickup truck. The device provides a cab which is suitable for children and also provides a locked space so that tools or other valuable goods in the body of the truck are safe.

The unit of the present invention is easy to install and remove on a truck so that it can be removed at any time when it is desired to restore the truck to conventional pickup use.

The auxiliary device of the present invention provides a streamlined contour for the truck reducing wind resistance and improving gas mileage.

According to the present invention a novel means is provided for making a water-proof seal between the conventional cab of the truck and the auxiliary cab of the present invention.

An auxiliary seat is provided which is easily removable but which can be locked into the body for safety.

Access is provided to the auxiliary cab either through the main cab of the truck or from the rear.

Various additional features and advantages of the invention will be brought out in the balance of the specification.

DESCRIPTION OF THE PREFERRED EMBODIMENTS

Figure 1:
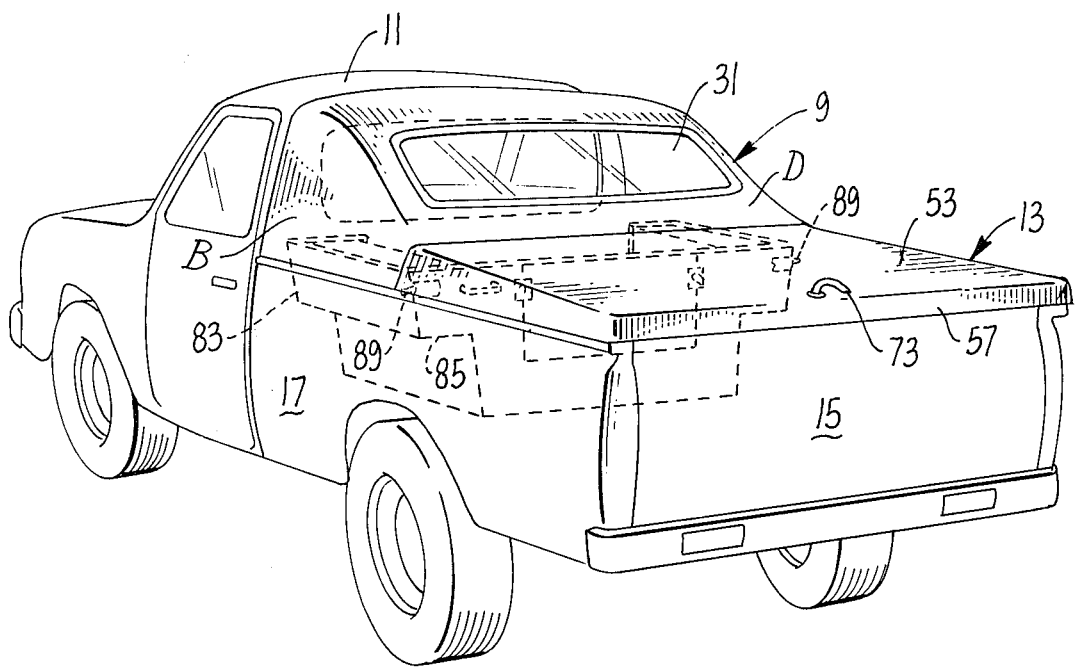
FIG. 1 is a perspective rear view of a pickup truck showing a cab and tonneau unit embodying the present invention installed thereon.

Referring now to the drawings by reference characters, there is shown a pickup truck generally designated 9 having a conventional cab 11 with the usual pickup body or bed generally designated 13 thereon. The body has a rear tailgate 15 and side members 17 and 19. The truck body or bed is essentially separate from the cab and has a front wall 21.

The auxiliary cab and tonneau attachment of the present invention is built on a frame including side members 23 and 25 and a front member 27. As can best be seen in FIG. 2, the side members 23 do not run the entire length of the body of the truck but extend a little over one-third the length of the truck body. Mounted on the side members 23 and 25 and front member 27 is an auxiliary cab 29, preferably made of glass fiber having a front wall A, opposite side walls B and C, and a downwardly and rearwardly sloping back wall D having rear window opening 31 therein. The auxiliary cab has an open bottom terminating in a peripheral bottom edge E. The auxiliary cab conforms in height and width to the regular cab. The opening 31 is the same size as the conventional rear window opening 33 on the regular cab of the truck so that the window glass is merely removed from the cab of the pickup and reinstalled as at 35 in the auxiliary cab of the present invention. The front of the auxiliary cab has an opening corresponding in size and placement to the rear window opening of the regular cab. This leaves a free opening 37 between the regular cab of the truck and the auxiliary cab so that it is easy for children to climb in and out of the auxiliary cab or for an adult to move materials for cartage in and out through the opening.

Figure 5:
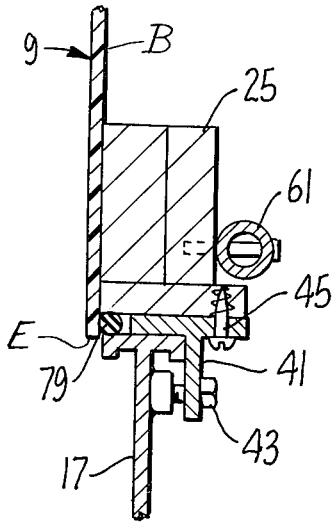
FIG. 5 is an enlarged section on the line 5—5 of FIG. 2.
Figure 6:
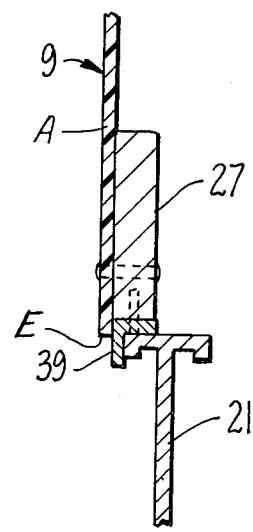
FIG. 6 is an enlarged section on the line 6—6 of FIG. 3.

The auxiliary cab is held to the front of the body of the truck by a lip 39 which extends down from the front member 27 over the front wall 21 of the truck body. At the sides of the truck body, as is best seen in FIG. 5, T-shaped clips 41 are fastened by bolts 43 to the side 17 (and to the opposite side, not illustrated) and conventional wood screws 45 are used to fasten the auxiliary cab onto the body of the truck. This means that it is only necessary to remove the screws 45 (conveniently three on each side of the body) and lift the cab unit up so that lip 39 clears the front wall 21. This permits the cab to be installed or to be removed in a matter of minutes. Members 41 would ordinarily be left attached to the truck body.

Figure 2:
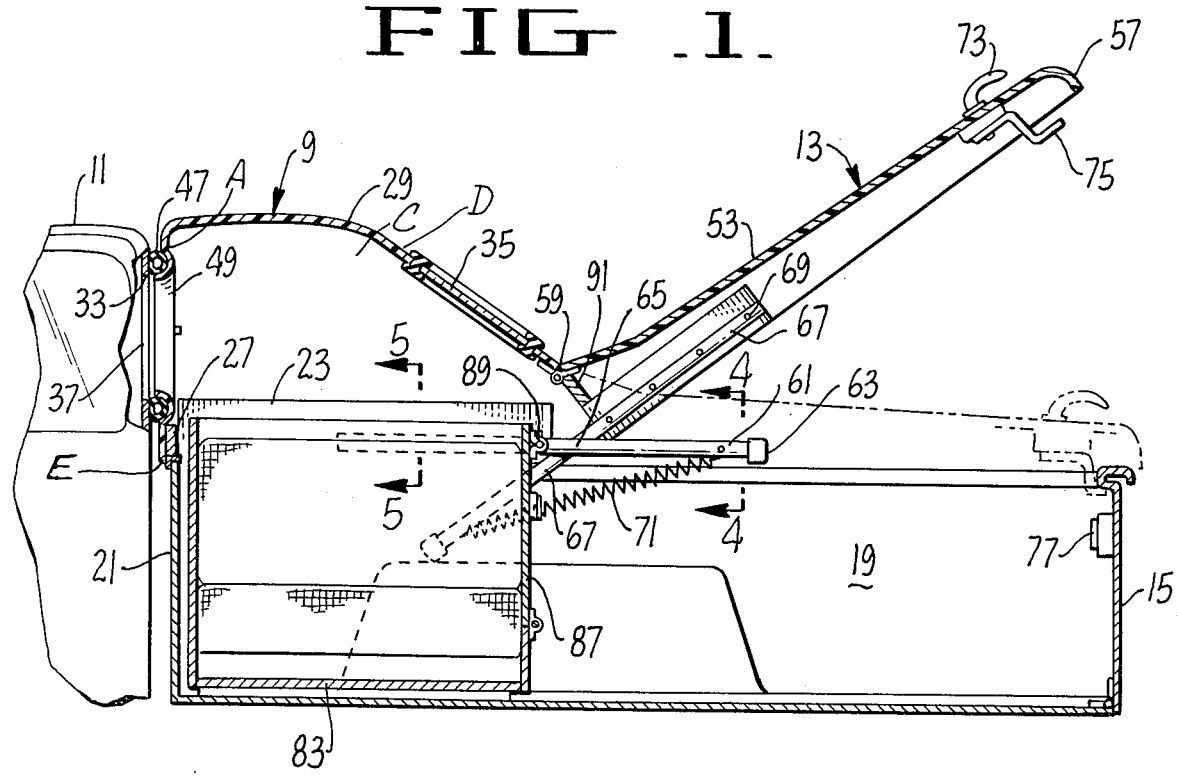
FIG. 2 is a sectional side view of a unit embodying the present invention.
Figure 3:
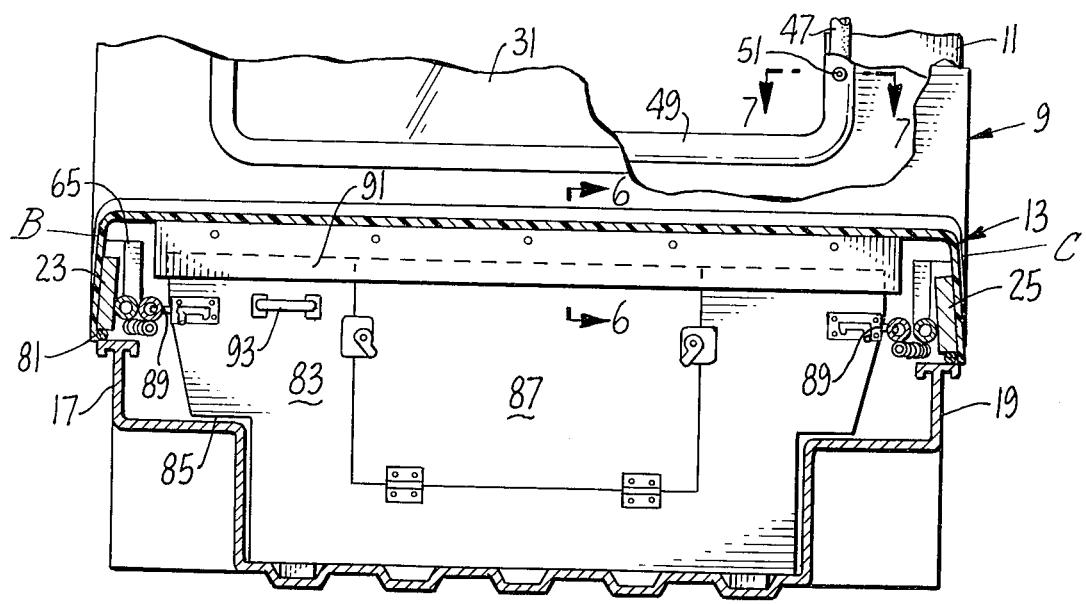
FIG. 3 is a sectional view taken from the rear of the vehicle.
Figure 7:
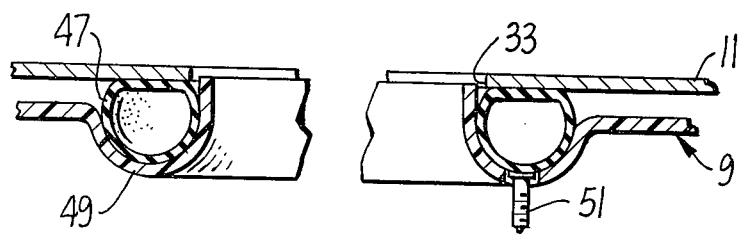
FIG. 7 is an enlarged section on the line 7—7 of FIG. 3.

In order to provide a waterproof and dustproof seal as well as to prevent rattles, a pneumatic gasket is employed between the auxiliary cab 29 and the regular cab 11 of the truck. This is designated 47 and is best seen in FIGS. 2 and 7. The gasket 47 extends completely around the window opening and fits in a groove 49 formed in the front of the auxiliary body. Tube 47 can conveniently be a bicycle tube of suitable size and is equipped with the usual valve stem 51 for inflation. The cab is installed with the tube deflated and when the cab is otherwise in place, the tube is inflated. This provides a water and dustproof seal between the regular cab and the auxiliary cab and also serves to prevent rattles and tightens the auxiliary cab on the body by forcing the lip 39 against the end 21 of the truck body.

Figure 4:
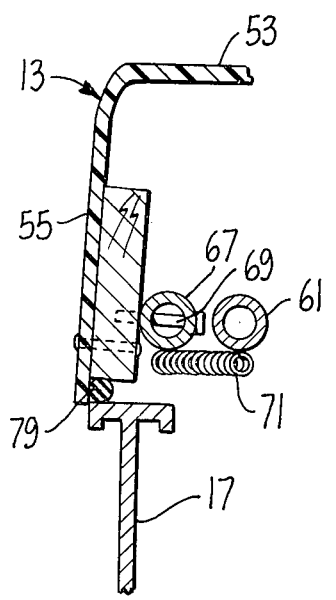
FIG. 4 is an enlarged section on the line 4—4 of FIG. 2.

The tonneau cover consists essentially of a large, flat member 53 having downturned edges 55 on either side thereof and a downturned rear edge 57. The tonneau cover is attached at its forward end by a piano hinge 59. Rods 61 are attached to side member 25 and extend to the rear of the auxiliary cab terminating at 63. The rods 61 on each side of the vehicle serve two purposes, one of which, as is later explained in detail, is to serve as a point of attachment for a seatbox and the other of which is to provide a hinge support at 65 for rods 67 which are attached to the side members of the tonneau cover. The attachment on the wall 55 is shown in FIG. 4 where rod 67 is attached by means of bolt 69. The forward end of rod 67 is attached to a spring 71 which extends between the rods 67 and 65 as shown, so that a lid is counterbalanced. The tonneau cover is provided with a locking handle 73 and when the cover is closed, as is shown in dot-dash lines in FIG. 2, the locking arm 75 attached to handle 73 locks under the lip of tailgate 15 so that one does not have access from the outside to the regular tailgate releasing mechanism 77. Thus, when the tonneau cover is in place and in the down position, the contents of the entire body of the truck are safe from pilferage and the like. Further, the edges of the tonneau cover are provided with a gasket 79 while there is a similar gasket 81 on the supports for the auxiliary cab so that an essentially rain and dustproof cover structure is provided.

A seatbox 83 fits inside of the auxiliary cab and has seats 85 on each side thereof suitable for children. Although access to the seatbox would normally be through the opening 37 from the regular cab of the truck, a rear door 87 is provided in a back wall of the seat box to permit access to the seatbox from the rear, particularly in case of emergencies. The seatbox is provided with sliding bolts 89 which fit into opening of the rods 65 so that the seatbox is locked firmly in place. Further, the forward edge of the tonneau cover has a lip 91 which extends in front of the seatbox so that when the tonneau cover is down, it prevents the seatbox from shifting. Thus, as a safety precaution, the seatbox is doubly locked by the bolts 89 and the lip 91. If it is desired not to use the seatbox, it is readily removed by releasing the sliding bolts 89 and pulling on handles 93.

Although a preferred structure has been described, it will be obvious to those skilled in the art that many changes can be made in the structure shown without departing from the spirit of this invention.

I claim:

1. A combined auxiliary cab and tonneau for a conventional pickup truck having a cab and truck bed, comprising: an auxiliary cab unit having a height when placed on the bed of the pickup truck about equal to the height of the regular truck cab and forming a continuation thereof and having a length less than the length of the bed, said auxiliary cab having a front wall with an opening therethrough, opposite side walls, a downwardly and rearwardly sloping back wall, and an open bottom terminating in a peripheral bottom edge; releasable fastening means on the peripheral bottom edge for releasably fastening the combined cab and tonneau to an upper marginal edge of the bed of a pickup; a tonneau hingedly connected to the auxiliary cab and having a top wall, opposite side edge portions and front and back edge portions; hinge means connecting the front edge portion of the tonneau to the peripheral bottom edge of the back wall of the auxiliary cab, said tonneau extending from the back wall of the auxiliary cab to the back of the pickup bed when in use; lock means on the back edge portion of the tonneau cooperable with means on the back of the pickup bed to lock the tonneau in closed, covering relationship to the pickup bed; a removable seat box means releasably supported in the auxiliary cab for seating passengers, said seat box means including a back wall beneath and in substantial alignment with the back wall of the auxiliary cab and having a door means therein for gaining access thereto from the bed of the pickup; spring means connected between the tonneau and the auxiliary cab to counterbalance the tonneau; and seat box retaining means on the front edge portion of the tonneau, engaging the seat box to aid in securing it in position when the tonneau is closed.

2. A combined auxiliary cab and tonneau as in claim 1, wherein the opening through the front wall of the auxiliary cab corresponds in size and shape with a rear window of the cab of the truck and is in registry therewith, and seal means engaged between the cab and auxiliary cab around the window and opening therein, respectively, forming a seal thereat.

3. A combined auxiliary cab and tonneau as in claim 2, wherein the back wall of the auxiliary cab has an opening therethrough aligned with the opening through the front wall thereof.

4. A combined auxiliary cab and tonneau as in claim 1, wherein the seat box retaining means comprises a downwardly extending lip on the front edge portion of the tonneau, said lip engaging an upper edge portion of the back wall of the seat box when the tonneau is closed.

5. A combined auxiliary cab and tonneau as in claim 1, wherein the tonneau and auxiliary cab comprise glass fiber.

6. A combined auxiliary cab and tonneau as in claim 1, wherein releasable fastening means are engaged between the seat box and the auxiliary cab to retain the seat box in position when the tonneau is raised to its open position.

* * * * *